Aug. 17, 1937.  S. WILTSE  2,090,014

TUBING

Original Filed Feb. 12, 1930

INVENTOR.
Sumner Wiltse.
BY
Harness, Dickey, Pierce & Hann.
ATTORNEYS.

Patented Aug. 17, 1937

2,090,014

UNITED STATES PATENT OFFICE 2,090,014

TUBING

Sumner Wiltse, Detroit, Mich., assignor to Arthur S. Allen, Detroit, Mich.

Original application February 12, 1930, Serial No. 427,875, now Patent No. 2,008,534, dated July 16, 1935. Divided and this application April 13, 1934, Serial No. 720,363

3 Claims. (Cl. 154—8)

This invention relates to fluid conducting tubing and constitutes a division of my co-pending application Serial Number 427,875, filed Feb. 12, 1930, now Patent No. 2,008,534, issued July 16, 1935.

The main objects of this invention are to provide an improved construction of tubing particularly suitable for use where it is subjected to considerable vibration, such as the fuel and oil lines of airplane motors and the like; to provide an improved construction of tubing in which the vibration is substantially lessened or dampened; to provide a fluid conducting tubing which upon structural failure or rupture will not put the line entirely out of service, but continue to supply fluid therethrough, and to provide an improved construction in which any leaks or other failures may be readily and visually located.

An illustrative embodiment of this invention is shown in the accompanying drawing, in which.

At the present time the greatest number of failures in airplane flying are being caused by fuel lines and oil lines being split or broken by reason of the vibration to which they are subjected. Disastrous results are many times the result of structural failures, not only because of the inevitable forced landing, but particularly if it is a failure of the fuel line the gasoline leaking out through a split or break oftentimes catches fire, thus enveloping the entire machine in flames, causing an explosion of the gasoline tank with the consequent complete destroying of the machine and appalling loss of life.

Annealed copper tubing is universally used at the present time for the fuel and oil lines of airplane engines, and my improved invention consists in adding to this annealed copper tubing certain coverings of fabric and rubber which perform two useful functions.

The first function performed is by the covering of the tubing, damping or reducing the vibration of the tube very materially. The second function performed is that in the event of a split, break or other structural failure of the tubing, only a small amount of the fluid passing therethrough will leak out and an adequate and sufficient supply of the fluid will continue to pass to the engine even though the copper tube should become entirely broken in two parts.

Figure 1:
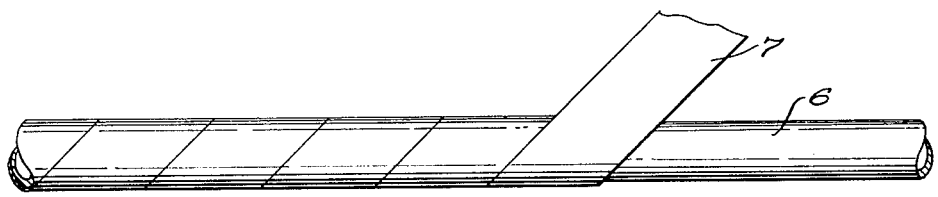
Fig. 1 is a view in elevation of the tubing during its first manufacturing operation.

In the construction shown in the drawing a length of annealed copper tubing 6, is covered with fabric, preferably of the friction type, by winding a strip of adhesive tape 7, or the like, helically about the tube as shown in Fig. 1 of the drawing. Ordinary electricians' friction tape is quite suitable for this purpose, particularly inasmuch as both sides of this kind of tape have adhesive material thereon.

The fabric covered tube is then provided with a tight fitting sleeve 8 of yielding or elastic material such as rubber, which under normal or unstressed conditions has a smaller inside diameter than the outside diameter of the fabric covered tube.

Figure 2:
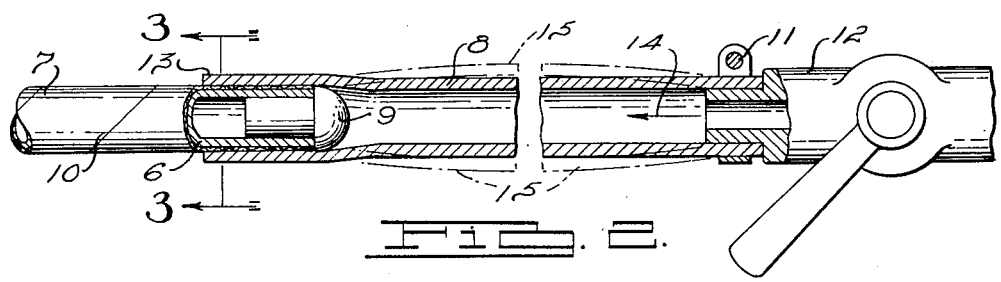
Fig. 2 is a view partly in elevation and partly in section, during the second manufacturing operation.
Figure 3:
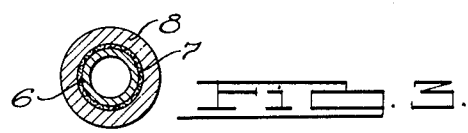
Fig. 3 is a sectional view taken on the line 3—3 of Fig. 2, looking in the direction indicated by the arrows.
Figure 4:
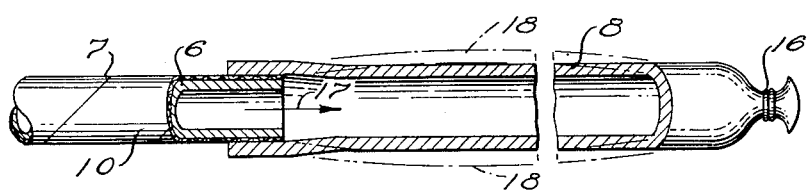
Fig. 4 is a view partly in elevation and partly in section, of a modified method of putting the outer covering on the tube.

The rubber cover may be assembled onto the fabric covered tube in either one of two different ways, as shown in Figs. 2 and 4 of the drawing. In the embodiment shown in Fig. 2 a round headed plug 9 is placed in the end of the fabric covered tube, designated 10 in this view. The rubber tube 8 is secured by a clamp 11 to the discharge end of an air valve 12, which communicates with a suitable source of air under pressure.

The outer end 13 of the rubber tube 8 is grasped by one hand of the workman and the fabric covered tube 10, held by the opposite hand, and abutted against the open end of the tube. At this time the air valve 12 is opened so that the air flows out into tube 8, as shown by the arrow 14. By reason of the plug 9 being abutted tightly against the end 13 of tube 8, the air being introduced into the rubber tubing will cause it to stretch and swell as shown by the dotted line 15, thus permitting the tube 10 to be readily inserted within the rubber covering 8. The air valve 12 is then closed and the elasticity of the rubber tube 8 will cause it to tightly grip the outside of the fabric covered tube 10.

In the method shown in Fig. 4 of the drawing one end of the rubber tubing 8 is tied by a cord 16 so that air cannot escape therefrom. The fabric covered tube 10 is connected to a source of air under pressure so that the air will flow through the tubing 6, as shown by the arrow 17. The end of the tube 10 is then abutted against the open end of the rubber tube 8, causing it to stretch and swell as shown by the dotted line 18, at which time the tube 10 may be readily inserted within its rubber cover. During the insertion of the tube in both instances air will be continually escaping around the outer side of the fabric covered tube, thus keeping the rubber tube 8 in loosely spaced relation to the tube 10 until it has been fully inserted therein.

Figure 5:
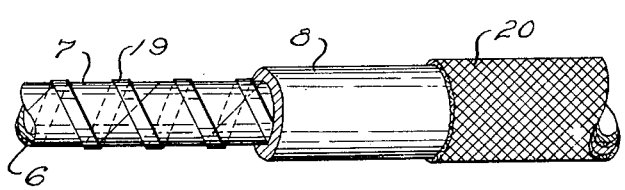
Fig. 5 is a view showing a modified form of constructing the product.

In the modification shown in Fig. 5, the general structure is strengthened and improved by helically winding a metallic ribbon 19 about the tube after the fabric 7 has been wound thereon. This ribbon may be ⅛ inch copper ribbon with two or three convolutions per inch if desired. After the elastic rubber covering 8 has been assembled upon the tube a knitted fabric outer covering 20 may be placed thereover, so as to protect the rubber from cuts, bruises and other injuries.

In the operation of this tubing the fabric and rubber covers being closely associated to the copper, and tightly gripping same, will tend to dampen or lessen vibration of the tubing to a very material extent.

However, in the event of any structural failure such as a split or a crack in the tube, gasoline or oil leaking through such a rupture will percolate through the fabric covering to a slight extent and when such fluid contacts with the rubber covering 8, it will cause the rubber to swell at that point due to the solubility of rubber in petroleum distillates or the chemical action between them. Such swelling of the rubber will, of course, be readily discernible to the eye, thus facilitating inspection of the fluid lines of the airplane or the like, even though the rupture may be of such slight character that if it occurred on bare tubing as heretofore used, gasoline leaking therethrough would be immediately evaporated by the atmosphere, and such leak would not be discernible to the inspector. Where the fabric cover 20 is employed, it may prevent visible swelling of the rubber, but the fuel or oil, as the case may be, will seep through the fabric and will discolor it so as to make the leak easily discernible.

Although but one specific embodiment and one modification of this invention have been herein shown and described, it will be understood that other details of the construction may be altered or omitted without departing from the spirit of this invention, as defined by the following claims.

I claim:

1. The method of making a fluid conducting line which comprises the helical winding of a metallic tube with a strip of adhesive fabric, plugging the end of the metallic tube, connecting one end of an elastic rubber tube to a source of fluid under pressure, abutting the plugged end of the metallic tube against the other end of said rubber tube, introducing fluid into said rubber tube with sufficient pressure to enlarge the diameter thereof, inserting the fabric covered metallic tube into the enlarged rubber tube, and then reducing the fluid pressure to permit the contraction of said rubber tube.

2. The method of making a fluid conducting line which comprises providing a metal fluid conducting conduit, closing one end of the conduit by means of a plug, applying a rubber tubing to one end of the conduit, inflating the rubber tubing by fluid pressure and slipping it over the metal tubing during which the plug prevents fluid from flowing through the metal tubing, removing the fluid pressure to allow the rubber tubing to contract about the metal tubing and withdrawing the plug.

3. The method of making a fluid conducting line which comprises providing a metal fluid conducting conduit, closing one end of the conduit, applying a stretchable rubber-like tubing to one end of the conduit, inflating the tubing by fluid pressure and slipping it over the conduit during which fluid is prevented from flowing through the conduit, removing the fluid pressure to allow the tubing to contract about the conduit, and then opening the closed end of the conduit.

SUMNER WILTSE.